United States Patent [19]

Weinhold

[11] Patent Number: 5,074,600
[45] Date of Patent: Dec. 24, 1991

[54] DEVICE FOR CONNECTING THE END OF A HOSE TO A CONNECTING SPIGOT

[76] Inventor: Karl Weinhold, Im Jagdfeld 43, D-4040 Neuss, Fed. Rep. of Germany

[21] Appl. No.: 570,435

[22] Filed: Aug. 21, 1990

[30] Foreign Application Priority Data

Oct. 30, 1989 [DE] Fed. Rep. of Germany ....... 3936102

[51] Int. Cl.$^5$ ............................................ F16L 55/00
[52] U.S. Cl. .................................... 285/243; 285/174
[58] Field of Search ............... 285/253, 243, 252, 409, 285/420, 174, 322, 81

[56] References Cited

U.S. PATENT DOCUMENTS

| 817,058 | 4/1906 | Greenfield | 285/243 |
|---|---|---|---|
| 4,093,283 | 6/1978 | Weinhold | 285/243 |
| 4,152,016 | 5/1979 | Weinhold | 285/243 |
| 4,212,487 | 7/1980 | Jones et al. | 285/243 |

FOREIGN PATENT DOCUMENTS

| 1157864 | 11/1963 | Fed. Rep. of Germany | 285/243 |
|---|---|---|---|
| 2611175 | 9/1977 | Fed. Rep. of Germany | . |
| 3417924 | 10/1986 | Fed. Rep. of Germany | . |
| 3721063 | 5/1988 | Fed. Rep. of Germany | . |

*Primary Examiner*—Eric K. Nicholson
*Attorney, Agent, or Firm*—Herbert Dubno; Andrew Wilford

[57] ABSTRACT

An assembly for connecting an end of a hose to a spigot centered on an axis has an annular radially outwardly projecting collar formed on the spigot so that the hose end can be fitted over the spigot axially outward of the collar and a pair of inner shells having concave inner surfaces. An axially extending hinge bolt pivotally interconnects the inner shells and together with a lever and a spring can move the shells between a closed position with their inner surfaces pressed radially inward against the hose end fitted over the spigot and an open position spaced radially outward from the hose end fitted over the spigot. Respective outer shells integrally fixed on the inner shells and each have an axially inner end formed with a radially inwardly directed flange that engages in the closed position radially inward past the collar of the spigot axially inward of the collar so that the flanges and collar prevent the shells from being pulled axially outward off the spigot in the closed position. The outer shells also each have an outwardly flared axially outer end spaced axially outward substantially past the spigot and inner shells.

8 Claims, 3 Drawing Sheets

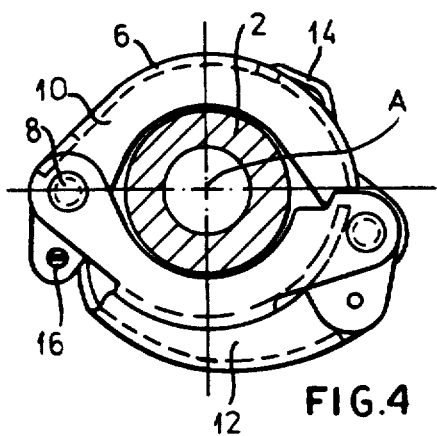
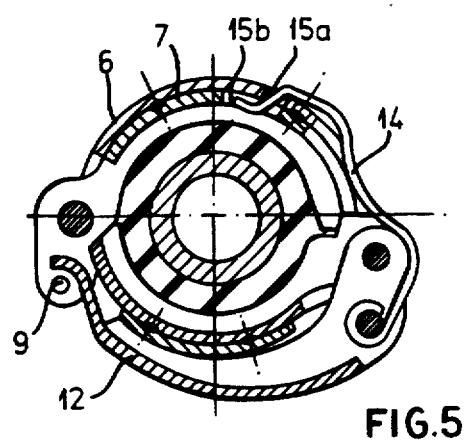
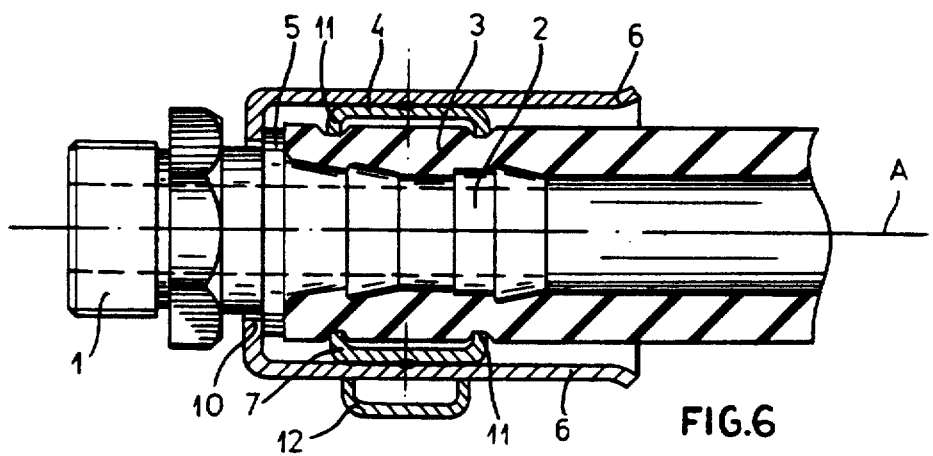
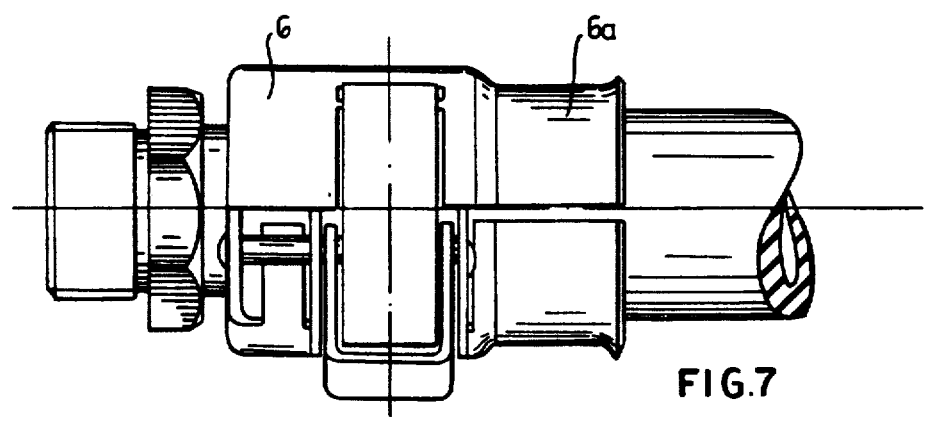

DEVICE FOR CONNECTING THE END OF A HOSE TO A CONNECTING SPIGOT

FIELD OF THE INVENTION

The invention relates to a device for connecting the end of a hose and having: a connecting spigot; a socket which forms part of the connecting spigot and on to which the hose end is slipped; a clamp which encloses the socket and is formed by at least two hinge-bolt-interconnected component shells having clamping flanges pressing the hose against the spigot; a gripping lever closure whose gripping lever is articulated to a component shell and whose spring connects the gripping lever releasably to the other component shell; and an annular collar which is formed on the connecting spigot and over which retaining flanges connected to the clamp engage, the clamp being prevented from being pulled off the socket in the axial direction, even when the gripping lever closure is opened but the spring is latched-in, by the annular collar having in the radial direction an extension which is greater than the clear width of the opening inside the retaining flanges in the opening position of the clamp.

BACKGROUND OF THE INVENTION

In a prior art device of the kind specified disclosed in German Patent 34 17 924 C2 the connecting spigot has at one end a screwthreaded bore with a hexagon head. Instead of this, the connecting spigot can also have a union nut or a dog clutch half or similar connecting means. The prior art device does not ensure that in a non-central position the clamp cannot be lifted by tilting over the annular collar, thus after all being pulled off the socket. Another prior art device disclosed in German Patent Specification 37 21 063, features of which appear in the preamble of the claim, is improved in this respect. Even with the gripping lever closure opened but the spring latched-in, the clamp is prevented from being pulled off the socket in the axial direction by the annular collar having in the radial direction an extension which is greater than the smallest distance of the retaining flanges from one another in the closure position of the clamp.

A device of the kind specified is also known from German OS 2611175 A1, wherein for stabilization—i.e., enhanced resistance to twisting—each component shell is connected more particularly by welding to an inner shell. At the same time the increase in the number of clamping flanges thereby rendered possible improves the contact pressure of the hose end on the socket.

OBJECT OF THE INVENTION

It is an object of the invention so to further improve a device having the features set forth in the preamble of the claim that the clamp is not only secured against being pulled off the socket axially, but can in a very simple manner be releasably connected to the connecting spigot. Protection is also offered against injury from the clamp and against the bending of the hose in the zone of the socket end.

SUMMARY OF THE INVENTION

To solve this problem, according to the invention in the device of the kind specified, attached to each of the two component shells of the clamp is a securing tubular half-shell which encloses and envelopes the clamp and on whose end adjacent the connecting spigot the retaining flange is formed, its opposite end extending in the axial direction to beyond the end of the socket.

With the novel features the apparatus of the kind specified solves the problem in question, since the securing tubular halfshells have the following effect:

the securing tubular half-shells enclose the clamp like a protective shield, thus allowing ready handling for the connection of the connecting spigot and preventing the user from hurting his or her hand on the clamp;

together with the retaining flanges engaging behind the annular collar on the connecting member, the securing tubular half-shells prevent the clamp from being pulled off the socket in the axial direction, even when the clamp is opened;

the portion of the securing tubular half-shells prolonged beyond the socket end prevents any sharp-edged bending of the hose with resulting breakages.

According to a preferred embodiment of the device according to the invention the securing tubular half-shells are connected to the component shells by welding, more particularly spot welding; and the securing tubular half-shells can also be connected to one another and to the component shells via the hinge bolt which connects the two component shells and is inserted through a bore in each of the retaining flanges. The result is a firm, solid connection of the securing tubular half-shells to one another and to the component shells.

If, according to another preferred feature of the apparatus according to the invention, the securing tubular half-shells are tapered to a smaller diameter in the portion concentrically enclosing the end of the socket, and if also preferably the free end of the securing tubular half-shells is flanged, said portion encloses the hose like a collar and gives it improved security against sharp-edged bending.

A manufacturing advantage is achieved by the preferred feature of the device according to the invention that the component shells are identically constructed and furthermore the securing tubular half-shells can also be identical. In that case, the production of each of these members requires only one tool. The feature also simplifies and cheapens stock holding and the procurement of spare parts.

To improve protection against unskillful or unauthorized manipulation, in an advantageous embodiment of the device according to the invention the gripping lever is secured against accidental opening by a cotter. The securing cotter further enhances the protection already offered by the securing tubular half-shells enveloping the clamp.

To obtain satisfactory guiding of the tube and security against bending at the socket end, conveniently the securing tubular half-shells extend beyond the end of the socket by at least 10% of its diameter.

BRIEF DESCRIPTION OF THE DRAWING

The above and other objects, features, and advantages will become more readily apparent from the following, reference being made to the accompanying drawing in which like elements have like references and in which:

FIGS. 4, 5, and 6 are sections taken respectively along lines IV—IV of FIG. 2, V—V of FIG. 2, and VI—VI of FIG. 3;

FIG. 7 and 8 are side and axial-sectional views of a second embodiment of the connector of this invention.

SPECIFIC DESCRIPTION

Figure 1:
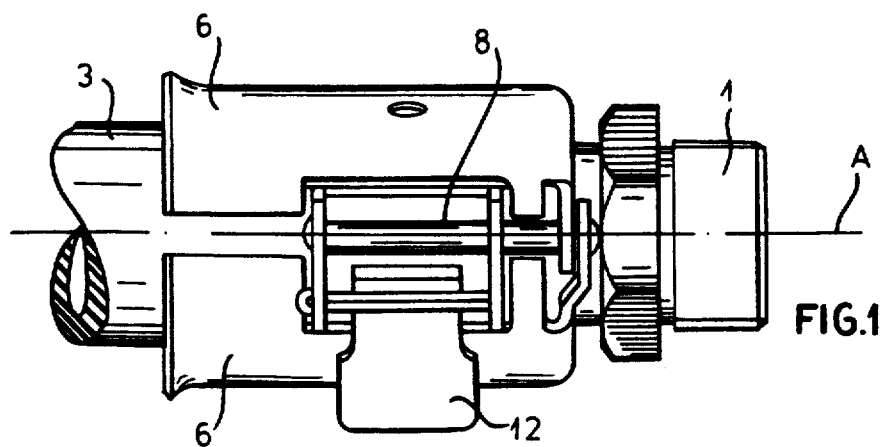
FIGS. 1, 2, and 3 are front side, bottom, and back side views of the connector according to the invention.
Figure 2:
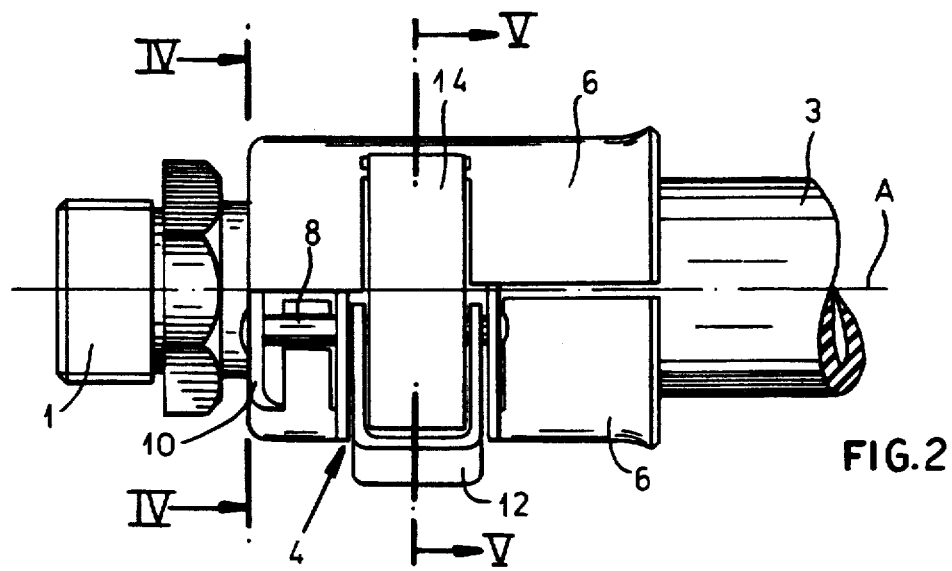
Figure 3:
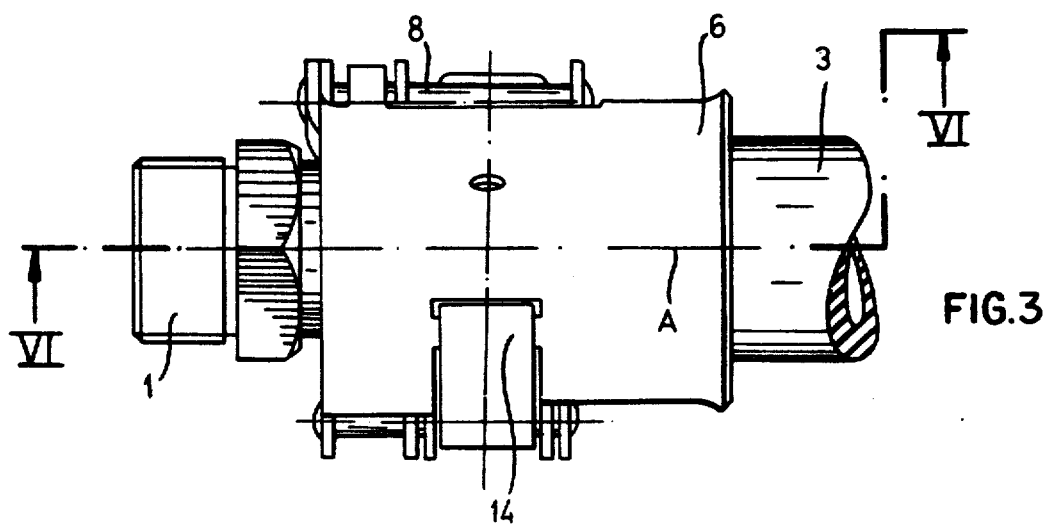

As seen in FIGS. 1 through 5, a connecting spigot 1 centered on an axis A is unitarily molded with a coaxial tubular nipple or socket 2 on to which the end of a hose 3 is slipped and clamped at that place by a clamp 4. Attached by spot welding to each component shell 7 of the clamp 4 is a securing tubular half-shell 6 which covers its periphery. Each of the two securing tubular half-shells 6 has at one end a retaining flange 10 engaging over an annular collar 5. The radial extension of the annular collar 5 and of the retaining flanges 10 is so selected as to prevent the clamp 4 from being pulled off the socket 2 axially even when the clamp is in the opened condition.

The two component shells 7 of the clamp 4 are hingeably interconnected via a hinge bolt 8. A prolongation of the hinge bolt 8 extends through openings in the retaining flanges 10, thus connecting in addition to the component shells 7 also their enclosing securing tubular half-shells 6, as shown most clearly in FIG. 1. In the closed condition the clamp 4 presses via its clamping flanges 11 the hose 3 on to the socket 2, as shown most clearly in FIG. 6.

To prevent the clamp 4 from being accidentally opened, it is possible to insert through an opening 9 a securing cotter 16 whose position (FIG. 5) is so selected in one of the component shells 7 that when the securing cotter 16 is inserted, it is impossible for the gripping lever 12 to move into the opening position.

The gripping lever 12 can move to open the clamp 4 only when the securing cotter 16 has been removed from the opening 9.

A spring 14 clamping the gripping lever 12 is inserted via its free end in slots 15a in one of the securing tubular half-shells 6 and 15b in the associated component shell 7 of the clamp 4. Only when this bent spring end has been pulled out of the slots 15a, 15b can the clamp be completely opened and pulled off the socket in the axial direction.

Figure 8:
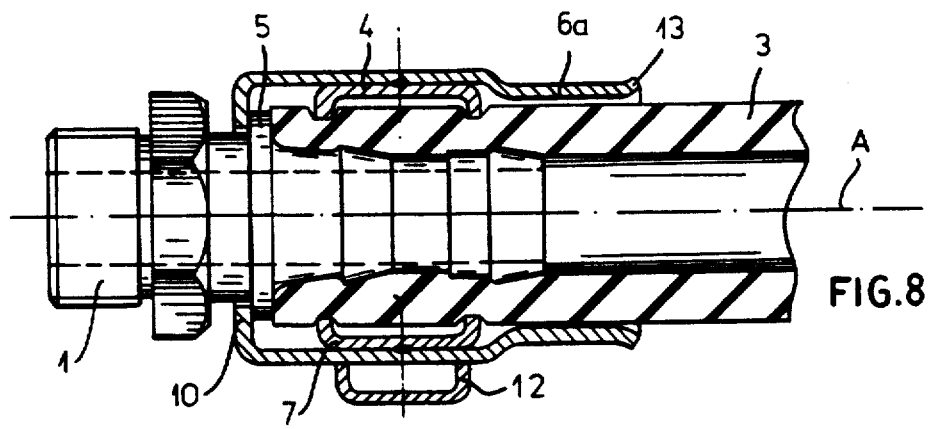

The construction illustrated in FIGS. 7 and 8 differs from that shown in FIGS. 1 to 6 in the withdrawn portion 6a of the securing tubular half-shells 6 in the zone of the end of the socket 2 and beyond. The tapered portions 6a form a collar tightly enclosing the hose, thus preventing the hose from sharp-edged bending around the socket end. The end of the withdrawn portion 6a of the securing tubular half-shell 6 is flanged in the form of a widened portion 13, so that it cannot contact the hose with a sharp edge.

Figure 9:
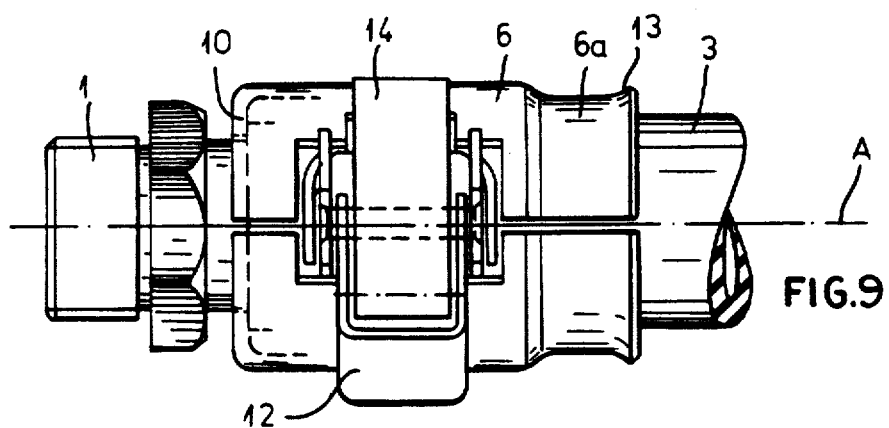
FIGS. 9 and 10 are elevational and cross-sectional views of a third embodiment of the connector.
Figure 10:
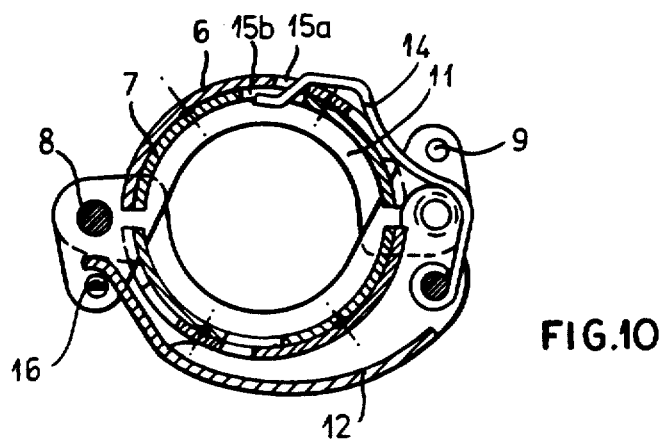

FIGS. 9 and 10 illustrate an embodiment of the device according to the invention in which a manufacturing advantage is obtained by the identical construction of the component shells 7 on the one hand and the securing tubular half-shells 6 on the other.

What is claimed is:

1. An assembly for connecting an end of a hose to a spigot centered on an axis, the assembly comprising:
    an annular radially outwardly projecting collar formed on the spigot, whereby the hose end can be fitted over the spigot axially outward of the collar;
    a pair of inner shells having concave inner surfaces;
    means including an axially extending hinge bolt pivotally interconnecting the inner shells, a lever, and a spring for movement of the shells between a closed position with their inner surfaces pressed radially inward against the hose end fitted over the spigot and an open position spaced radially outward from the hose end fitted over the spigot; and
    respective outer shells integrally fixed on the inner shells and each having
        an axially inner end formed with a radially inwardly directed flange that engages in the closed position radially inward past the collar of the spigot axially inward of the collar, whereby the flanges and collar prevent the shells from being pulled axially outward off the spigot in the closed position, and
        an outwardly flared axially outer end spaced axially outward substantially past the spigot and inner shells.

2. The hose-connecting assembly defined in claim 1 wherein each of the outer shells is connected by a weld to the respective inner shell.

3. The hose-connecting assembly defined in claim 1 wherein each of the outer shells is formed with a bore through which passes the hinge bolt.

4. The hose-connecting assembly defined in claim 1 wherein each of the outer shells has an axially inner portion level with the spigot and of a predetermined radius of curvature and an axially outer portion projecting axially outward past the spigot and of a smaller radius of curvature and having an outwardly flared outer end.

5. The hose-connecting assembly defined in claim 1 wherein the inner shells are similar.

6. The hose-connecting assembly defined in claim 1 wherein the outer shells are similar.

7. The hose-connecting assembly defined in claim 1, further comprising
    means including a cotter for retaining the lever against the shells in the closed position.

8. The hose-connecting assembly defined in claim 1 wherein the outer shells have a predetermined diameter and extend axially outward beyond the spigot by a distance equal to at least one-tenth of this diameter.

* * * * *